United States Patent
Jafari

(10) Patent No.: US 8,262,043 B2
(45) Date of Patent: Sep. 11, 2012

(54) UNIVERSAL METAL STUD CLIP

(75) Inventor: Afshin Jafari, Los Angeles, CA (US)

(73) Assignee: Orbit Industries, Inc., Los Angeles, CA (US)

(*) Notice: Subject to any disclaimer, the term of this patent is extended or adjusted under 35 U.S.C. 154(b) by 0 days.

(21) Appl. No.: 13/331,976

(22) Filed: Dec. 20, 2011

(65) Prior Publication Data

US 2012/0085566 A1 Apr. 12, 2012

Related U.S. Application Data

(63) Continuation of application No. 12/198,827, filed on Aug. 26, 2008, now Pat. No. 8,079,561.

(51) Int. Cl.
*A47B 96/06* (2006.01)

(52) U.S. Cl. ............ 248/231.81; 248/906; 174/50; 174/58

(58) Field of Classification Search ............ 248/231.81, 248/216.1, 216.4, 217.2, 300, 906, 205.1; 52/712; 174/50, 58, 63
See application file for complete search history.

(56) References Cited

U.S. PATENT DOCUMENTS

| | | | | |
|---|---|---|---|---|
| 3,131,447 | A * | 5/1964 | Tinnerman | 248/231.81 |
| 3,536,281 | A * | 10/1970 | Attore et al. | 248/73 |
| 3,730,466 | A * | 5/1973 | Swanquist | 248/216.4 |
| 4,140,293 | A * | 2/1979 | Hansen | 248/217.2 |
| 4,362,284 | A * | 12/1982 | Bolante | 248/228.7 |
| 5,408,045 | A * | 4/1995 | Jorgensen et al. | 174/58 |
| 5,841,068 | A * | 11/1998 | Umstead et al. | 174/58 |
| 6,354,543 | B1 * | 3/2002 | Paske | 248/68.1 |
| 6,389,658 | B1 * | 5/2002 | Pfaller et al. | 24/545 |
| 7,073,757 | B2 * | 7/2006 | Johnson et al. | 248/205.1 |
| 7,360,745 | B2 * | 4/2008 | Nikayin et al. | 248/216.1 |
| 7,381,892 | B2 * | 6/2008 | Dinh et al. | 174/58 |
| 8,079,561 | B2 * | 12/2011 | Jafari | 248/231.81 |

* cited by examiner

*Primary Examiner* — Anita M King
(74) *Attorney, Agent, or Firm* — Paul J. Backofen, Esq.; Crockett & Crockett, PC

(57) ABSTRACT

A universal metal stud clip is a support mechanism for securing one or more electrical boxes or other construction components to metal construction elements such as metal studs. The opposed spring arm design permits the clip to be oriented in any useful way and frictionally secured to metal studs of varying dimensions. Metal stud clips include one or more pair of resilient arms to frictionally engage metal studs. Using two or more pair of resilient arms provides a very stable attachment to the metal stud.

5 Claims, 4 Drawing Sheets

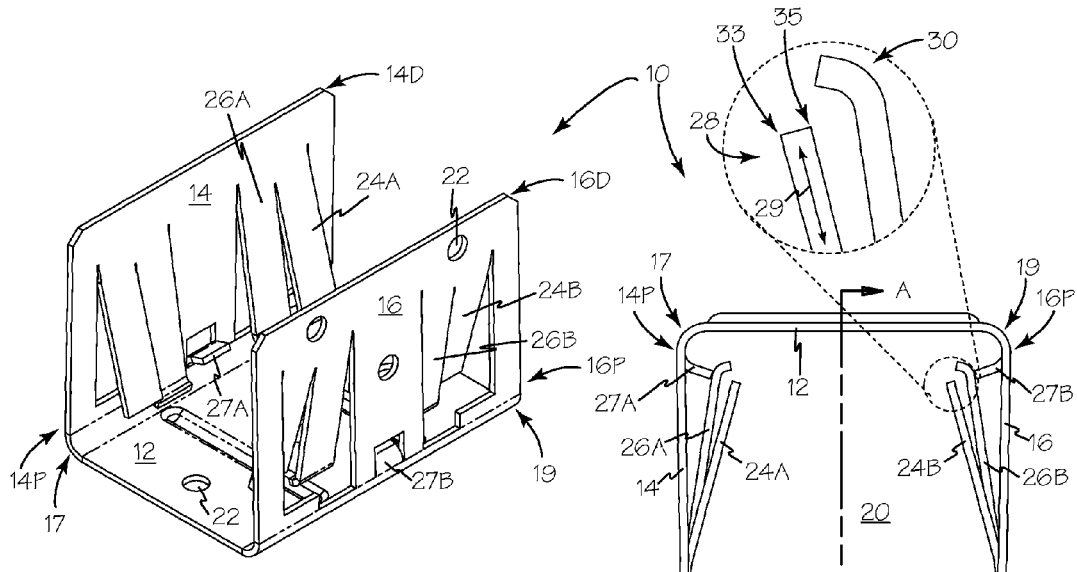
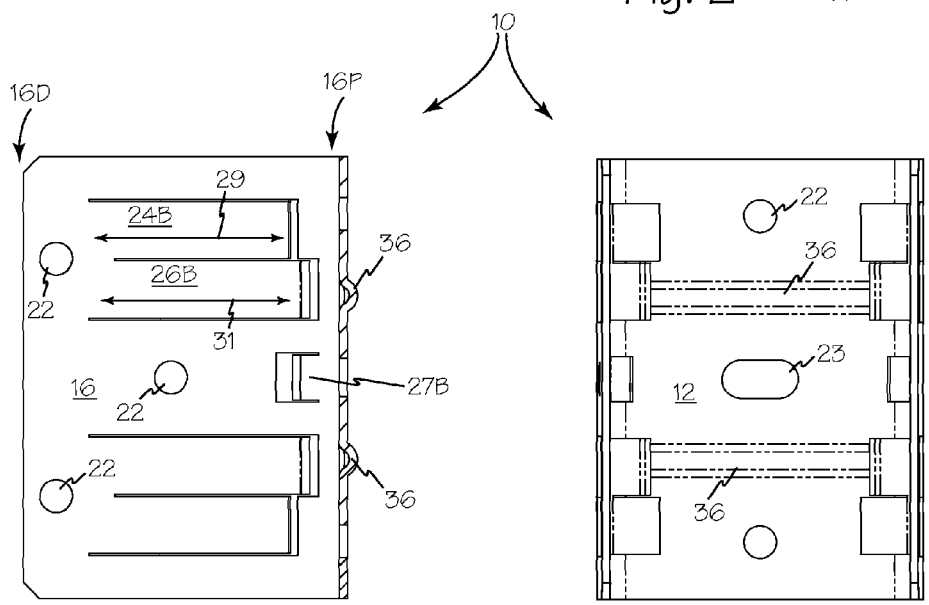

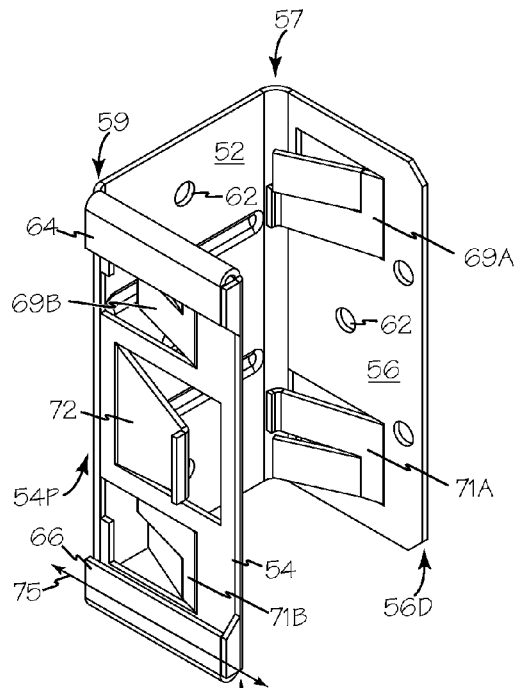
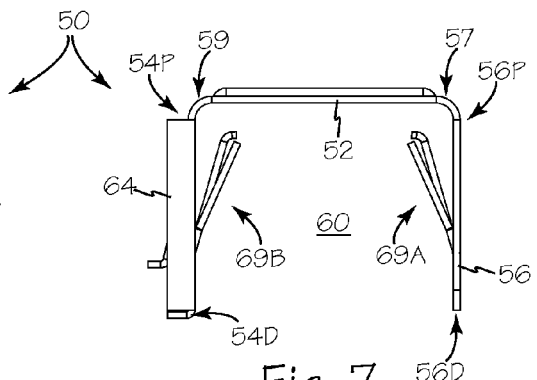
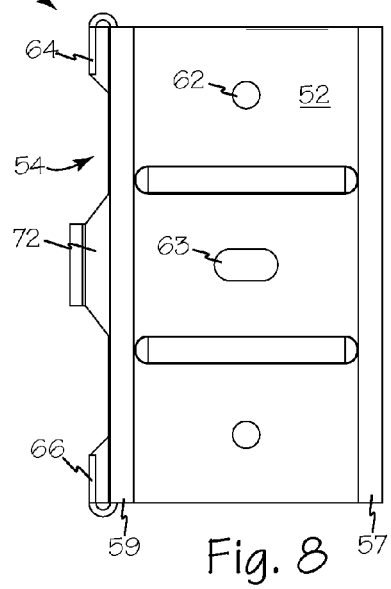
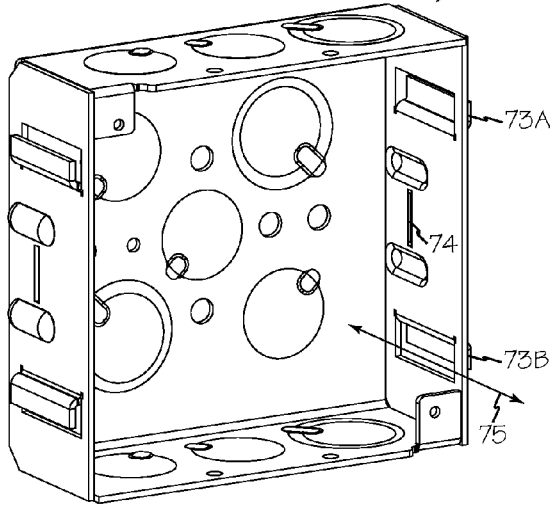
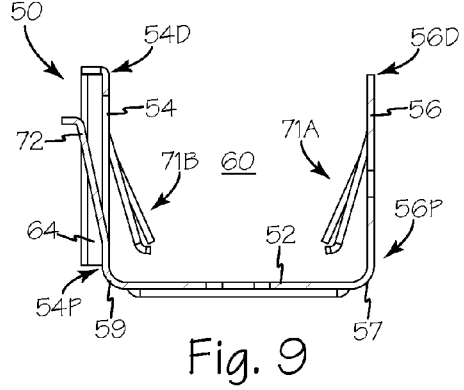
Fig. 6
Fig. 7
Fig. 8
Fig. 9
Fig. 10

UNIVERSAL METAL STUD CLIP

RELATED APPLICATIONS

This application is a continuation of U.S. patent application Ser. No. 12/198,827 filed Aug. 26, 2008, now U.S. Pat. No. 8,079,561.

FIELD OF THE INVENTIONS

The inventions described below relates to the field of electrical construction components and more specifically to clips for securing electrical boxes to metal construction studs.

BACKGROUND OF THE INVENTIONS

Conventional wood frame construction techniques are often adapted to metal frame construction. The technique of nailing an electrical box to a wooden stud does not translate well to metal frame construction.

SUMMARY

A universal metal stud clip is a support mechanism for securing one or more electrical boxes or other construction components to metal construction elements such as metal studs. The opposed spring arm design permits the clip to be oriented in any useful way and frictionally secured to metal studs of varying dimensions. Metal stud clips include one or more pair of resilient arms to frictionally engage metal studs. Using two or more pair of resilient arms provides a very stable attachment to the metal stud.

A metal stud clip includes two parallel flanges that permit attachment of one or more electrical boxes on each side of a single metal stud at the same height, or a known offset. This simplifies subsequent construction tasks such as hanging sheetrock. Additionally multiple boxes on a single clip may permit separate circuits to be collocated and secured to a single clip.

A clip for securing one or more electrical boxes to a metal stud includes a generally rectangular plate having two pair of opposed edges, two generally parallel flanges, each flange having a proximal edge and a distal edge, the proximal edges of the flanges joined to the plate, each flange joined along one edge of a pair of the two pair of opposed edges, two or more resilient arms formed from each of the two generally parallel flanges, each resilient arm of a flange having a proximal end and a distal end and forming an opposing pair of resilient arms with a resilient arm from the generally parallel flange, the proximal end of each resilient arm hingably formed from the flange near the distal edge of each of the two generally parallel flanges, with the distal end of each resilient arm inclined toward the plate, and one or more engagement arms formed from each of the two generally parallel flanges, the proximal end of each engagement arm hingably formed from each flange adjacent its proximal edge, with the distal end of each resilient arm inclined toward the generally parallel flange.

A universal metal stud clip includes a generally rectangular plate having two pair of opposed edges, a first and a second generally parallel flanges joined to the plate, each flange joined along one edge of a pair of the two pair of opposed edges, the combination of the first and a second flanges and the plate partially enclosing an engagement area, two or more pair of resilient arms formed from a portion of each of the first and a second flanges, each resilient arm having a proximal end and a distal end, the proximal end of each arm of a pair of resilient arms forming a hinge within the flange near the distal edge of each of the two generally parallel flanges, with the distal end of each resilient arm inclined toward the plate.

A universal metal stud clip may include a rectangular plate having two pair of opposed edges, a first and a second generally parallel flanges joined to the plate, each flange joined along one edge of a pair of the two pair of opposed edges, the combination of the first and a second flanges and the plate partially enclosing an engagement area and two or more pairs of opposed arms for engaging a metal stud extending into an engagement area. Each flange may also include two or more channels and a locking arm for removably securing an electrical box to the universal metal stud clip. A suitable electrical box may include a tab corresponding to each channel on the metal stud clip and a slot for engaging the locking arm to secure the electrical box to the metal stud clip.

BRIEF DESCRIPTION OF THE DRAWINGS

FIG. 1 is an isometric view of a universal metal stud clip.
FIG. 2 is a top view of the clip of FIG. 1.
FIG. 3 is a cutaway side view of the clip of FIG. 2 taken along line A-A.
FIG. 4 is a front view of the clip of FIG. 1.
FIG. 6 is an isometric view of a universal metal stud clip for removably engaging an electrical box.
FIG. 7 is a top view of the clip of FIG. 6.
FIG. 8 is a back view of the clip of FIG. 6.
FIG. 9 is a bottom view of the clip of FIG. 6.
FIG. 10 is an isometric view of an electrical box for removably engaging the universal metal stud clip of FIG. 6.

DETAILED DESCRIPTION OF THE INVENTIONS

Figure 5:
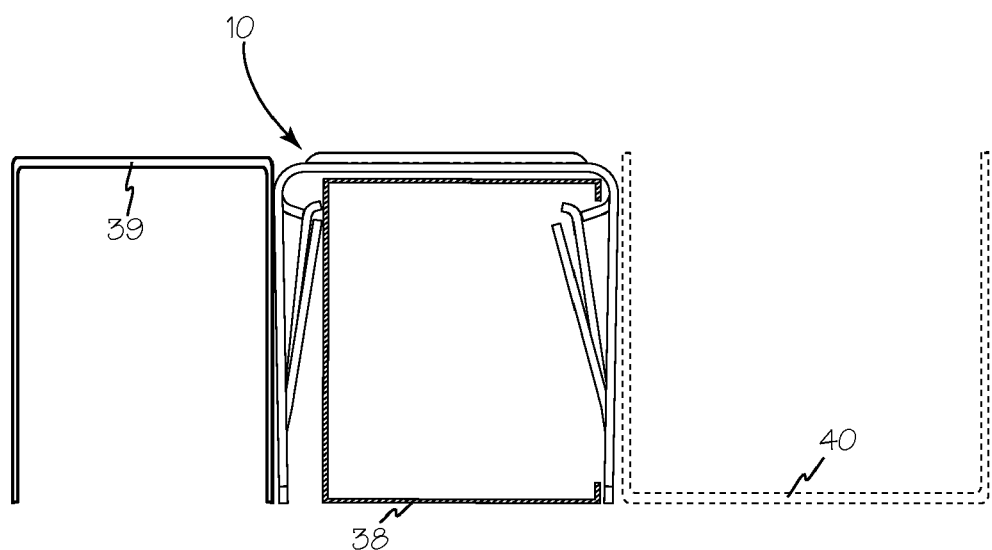
FIG. 5 is a top view of a universal metal stud clip securing an electrical box to a metal stud.
Figure 11:
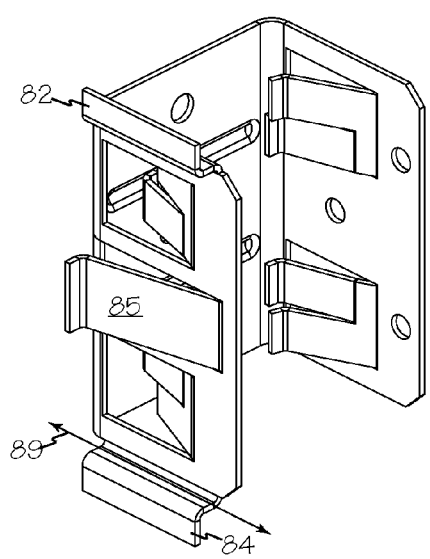
FIG. 11 is a side view of a universal metal stud clip for removably engaging an electrical box.
Figure 12:
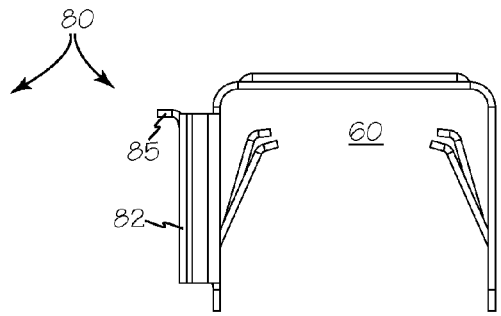
FIG. 12 is a top view of the clip of FIG. 11.
Figure 13:
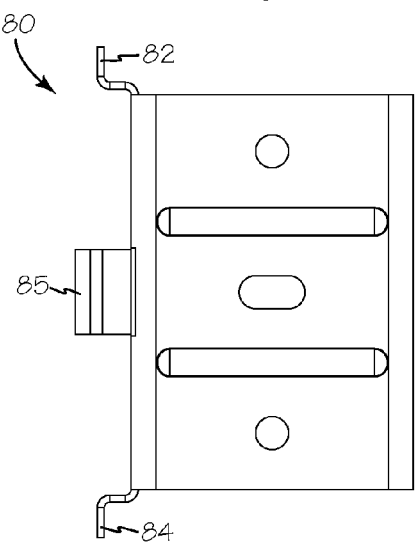
FIG. 13 is a back view of the clip of FIG. 11.
Figure 15:
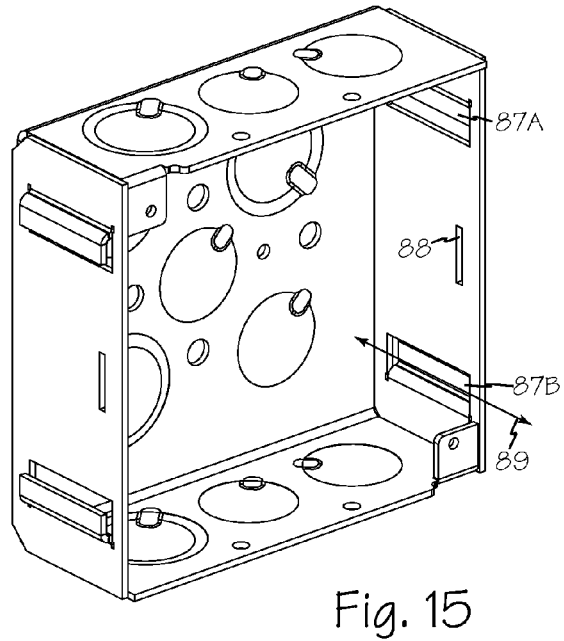
FIG. 15 is an isometric view of an electrical box for removably engaging the universal metal stud clip of FIG. 11.
Figure 14:
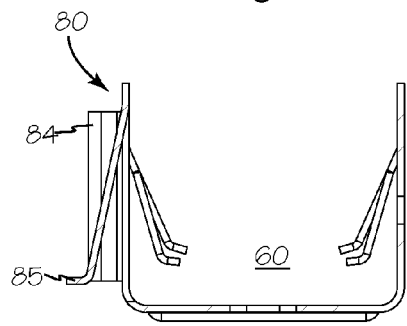
FIG. 14 is a bottom view of the clip of FIG. 11.

In FIGS. 1 and 2, metal stud clip 10 includes a generally rectangular plate 12 joining first flange 14 and second flange 16. First flange 14 and second flange 16 each have a proximal and distal edge, 14P and 14D, 16P and 16D respectively. First flange 14 and second flange 16 are generally perpendicular to plate 12 and the proximal edge of each flange, 14P and 16P, joins plate 12 along corners 17 and 19 respectively forming a generally C-shaped channel and an engagement area 20 between the first and second flanges 14 and 16. Plate 12, first flange 14 and second flange 16 also include at least one attachment hole such as attachment holes 22 or holes 23 for securing any suitable element such as an electrical box to clip 10.

A portion of each flange is cut, stamped or otherwise separated to form at least three pairs of arms for frictionally engaging a metal stud or other construction element. One or more pair of arms may be arranged in opposing pairs such as opposed arm pair 24A and 24B, and opposed arm pair 26A and 26B. Opposed arm pairs are hinged within the flanges near distal edges 14D and 16D of each flange. Engagement arms such as engagement arms 27A and 27B are also oriented within each flange in opposition, however, engagement arms are hinged near the proximal edge of each flange, 14P and 16P respectively, with the engagement arms extending up and away from plate 12.

Referring now to FIGS. 2 and 3, distal ends 28 and 30 of each resilient arm such as resilient arms 24B and 26B are square cut perpendicular to the primary axis of the arm such as axes 29 and 31 of resilient arms 24B and 26B respectively. The configuration of each arm end results in two generally parallel straight edges such as edges 33 and 35. Distal ends of resilient arms such as distal ends 28 and 30 may be straight as distal end 28, of may be curved such as distal end 30, or any suitable combination.

Referring now to FIG. 3 and FIG. 4, plate 12 may include one or more ribs such as ribs 36. Ribs such as ribs 36 may be arranged parallel to each other and perpendicular to the plate edges where the flanges are joined.

Referring now to FIG. 5, a universal metal stud clip such as clip 10 may engage any suitable metal building component such as metal stud 38. Each resilient arm is compressed to its respective flange enabling metal stud 38 to be frictionally engaged. One or more electrical boxes such as electrical box 39 and or electrical box 40 may be secured as discussed above, to clip 10 and thus also engaged to metal stud 38.

In FIGS. 6 through 9, metal stud clip 50 includes a generally rectangular plate 52 joining first flange 54 and second flange 56. First flange 54 and second flange 56 each have a proximal and distal edge, 54P and 54D, 56P and 56D respectively. First flange 54 and second flange 56 are generally perpendicular to plate 52 and the proximal edge of each flange, 54P and 56P, joins plate 52 along corners 57 and 59 respectively forming a generally C-shaped channel and an engagement area 60 between the first and second flanges 54 and 56. Plate 52, first flange 54 and second flange 56 also include at least one attachment hole such as attachment holes 62 or holes 63 for securing any suitable element such as an electrical box to clip 50. Alternatively, first flange 54 may include two or more opposing channels such as first channel 64 and second channel 66 for engaging a suitable electrical box such as electrical box 68 of FIG. 10.

A portion of each flange is cut, stamped or otherwise separated to form at least two pairs of arms for frictionally engaging a metal stud or other construction element. One or more pair of arms may be arranged in opposing pairs such as opposed arm pair 69A and 69B, and opposed arm pair 71A and 71B. Opposed arm pairs are hinged within the flanges near distal edges 54D and 56D of each flange. For each flange that includes channels for securing an electrical box, a locking arm such as locking arm 72 is included, and the locking arm is hinged near the proximal edge of each flange such as proximal edge 54P.

Referring now to FIG. 10, electrical box 68 includes two or more tabs such as tabs 73A and 73B suitable for engaging channels 64 and 66 of universal metal stud clip 50. As tabs 73A and 73B slide into channels 64 and 66 resilient locking arm 72 engages locking slot 74. To disengage electrical box 68 from universal metal stud clip 50, resilient locking arm 72 is separated from locking slot 74 and electrical box 68 is slid relative to universal metal stud clip 50 along engagement axis 75.

Referring now to FIGS. 11 through 14, in an alternate configuration, universal metal stud clip 80 includes engagement tabs 82 and 84 as well as resilient locking arm 85. Electrical box 86 includes two or more channels such as channels 87A and 87B suitable for engaging tabs 82 and 84 of universal metal stud clip 80. As channels 87A and 87B slide into tabs 82 and 84 resilient locking arm 85 engages locking slot 88. To disengage electrical box 86 from universal metal stud clip 80, resilient locking arm 85 is separated from locking slot 88 and electrical box 86 is slid relative to universal metal stud clip 80 along engagement axis 89.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A clip for securing one or more electrical boxes to a metal stud comprising:

a generally rectangular plate having two pair of opposed edges;

two generally parallel flanges, each flange having a proximal edge and a distal edge, the proximal edges of the flanges joined to the plate, each flange joined along one edge of a pair of the two pair of opposed edges;

two or more resilient arms formed from each of the two generally parallel flanges, each resilient arm having a proximal end and a distal end and forming an opposing pair of resilient arms with a resilient arm from the other of the two generally parallel flanges, the proximal end of each resilient arm hingably formed from the flange near the distal edge of each of the two generally parallel flanges, with the distal end of each resilient arm inclined toward the plate; and one or more engagement arms formed from each of the two generally parallel flanges, the proximal end of each engagement arm hingably formed from each flange adjacent its proximal edge, with the distal end of each resilient arm inclined toward the generally parallel flange.

2. The clip of claim 1 wherein the generally rectangular plate further comprises:

two generally parallel ribs formed into the plate and oriented perpendicular to the pair of edges joined to the proximal edges of the generally parallel flanges.

3. The clip of claim 1 further comprising:

one or more electrical boxes secured to the clip.

4. The clip of claim 1 further comprising:

an electrical box secured to the plate.

5. The clip of claim 1 further comprising:

an electrical box secured to each of the two generally parallel flanges.

* * * * *